United States Patent
Franz et al.

(10) Patent No.: US 10,240,997 B2
(45) Date of Patent: Mar. 26, 2019

(54) SENSOR MEMBERS

(71) Applicant: HEWLETT PACKARD ENTERPRISE DEVELOPMENT LP, Houston, TX (US)

(72) Inventors: John Franz, Houston, TX (US); Tahir Cader, Liberty Lake, WA (US); William Kirk Norton, Houston, TX (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 220 days.

(21) Appl. No.: 15/257,554

(22) Filed: Sep. 6, 2016

(65) Prior Publication Data

US 2018/0067012 A1    Mar. 8, 2018

(51) Int. Cl.
*G01M 3/04* (2006.01)
(52) U.S. Cl.
CPC ..................................... *G01M 3/04* (2013.01)
(58) Field of Classification Search
CPC .................................. G01M 3/04; G05B 9/02
USPC .................................................. 73/46
See application file for complete search history.

(56) References Cited

U.S. PATENT DOCUMENTS

| | | | | |
|---|---|---|---|---|
| 7,383,721 B2* | 6/2008 | Parsons | .................. | A01G 25/16 73/46 |
| 2013/0075149 A1* | 3/2013 | Golko | .................. | H01R 13/516 174/359 |
| 2013/0180318 A1* | 7/2013 | Howard | ................ | G01M 3/022 73/49.2 |
| 2014/0208831 A1* | 7/2014 | Ghodrati | ............... | G01M 3/042 73/46 |
| 2014/0260554 A1* | 9/2014 | Rankin | ................... | G01M 3/40 73/46 |
| 2015/0268126 A1* | 9/2015 | Jordan | ................ | G01M 3/2853 73/46 |
| 2017/0268495 A1* | 9/2017 | Overson | ................. | A61M 1/28 |

* cited by examiner

*Primary Examiner* — Clayton E. LaBalle
*Assistant Examiner* — Dennis Hannock
(74) *Attorney, Agent, or Firm* — Hewlett Packard Enterprise Patent Department

(57) ABSTRACT

An assembly to detect fluid leaks is provided herein. For example, the assembly includes a plug, a gasket, and a sensor member. The plug is connected to a first electronic module. The gasket surrounds the plug to provide a fluid-tight seal around the plug. The sensor member is connected to the gasket to detect fluid loss that exceeds a predetermined amount.

18 Claims, 6 Drawing Sheets

SENSOR MEMBERS

BACKGROUND

Electronic devices have temperature requirements. Heat from the use of the electronic devices is controlled using cooling systems. Examples of cooling systems include air and liquid cooling.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the present disclosure may be practiced. It is to be understood that other examples may be utilized and structural or logical changes may be made without departing from the scope of the present disclosure.

Electronic system designs must balance conflicts between power density, spatial layout, temperature requirements, acoustic noise, and other factors. Air cooling systems typically use heat sinks and fans to remove "waste" heat from the system. The use of heat sinks and fans increase the electrical power required to operate an electronic device in an electronic system, and may cause excessive acoustic noise and lower system density. Liquid cooling can be more efficient than air cooling; however, the liquid cooling typically includes plumbing connections within the electronic devices. As the liquid goes through the plumbing connections the risk of leakage of liquid within the electronic device is introduced.

The liquid cooling solutions for server equipment typically include fluid connections using blind mate connectors. When properly installed and handled, liquid cooled servers are reliable. As the deployment of liquid-cooled servers increases, the servers will be used in environments that will increase the chance that the servers are subjected to contaminants, which will result in difficult operating conditions. Blind mate connectors may be prone to damage due to contaminants and/or improper usage. In the event of a leak, detecting leaks close to the fluid connection may avoid or at least minimize any damage to equipment and may save costs associated with repair and system down time.

In examples, an assembly is provided. The assembly includes a plug, a gasket, and a sensor member. The plug is connected to an electronic module. The gasket surrounds the plug to provide a fluid-tight seal around the plug. The sensor member is connected to the gasket to detect fluid loss that exceeds a predetermined amount.

The phrase "electronic module" as used herein refers to a computing device, such as a rack, server, a blade server, or a server cartridge that provides computer solutions, storage solutions, network solutions, and/or cloud services. An electronic module may also include a server structure such as a rack or manifold containing electronic components.

Figure 1:
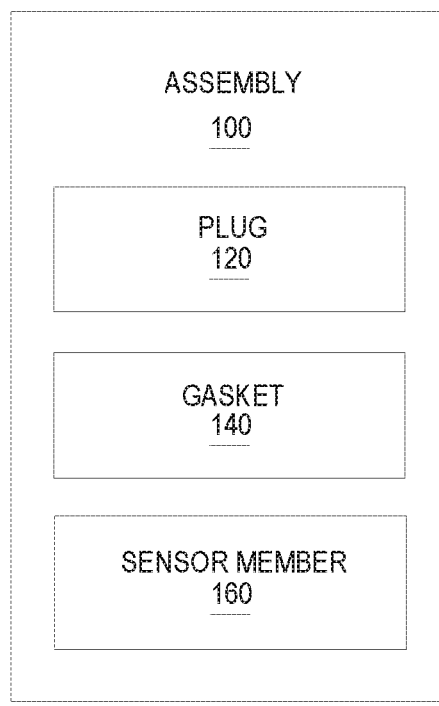
FIG. 1 illustrates a block diagram of an assembly according to an example.

FIG. 1 illustrates a block diagram of an assembly according to an example. The assembly 100 includes a plug 120, a gasket 140, and a sensor member 160. The plug 120 is connected to an electronic module. The gasket 140 surrounds the plug 120 to provide a fluid-tight seal around the plug 120. The sensor member 160 is connected to the gasket 140 to detect fluid loss that exceeds a predetermined amount. For example, the fluid loss may be measured by the volume of fluid that is lost. In particular the assembly detects fluid loss in excess of a normal fluid volume loss since dripless disconnects are not completely lossless. During normal use, connections may generate a thin fluid film that would be less than the predetermine amount or volume detectable by the sensor member 160.

Figure 2:
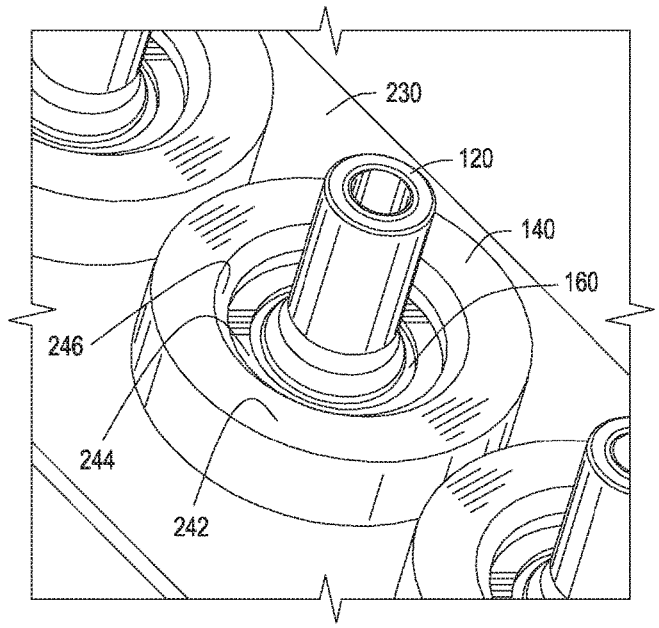
FIG. 2 illustrates a perspective view of the apparatus of FIG. 1 according to an example.
Figure 3:
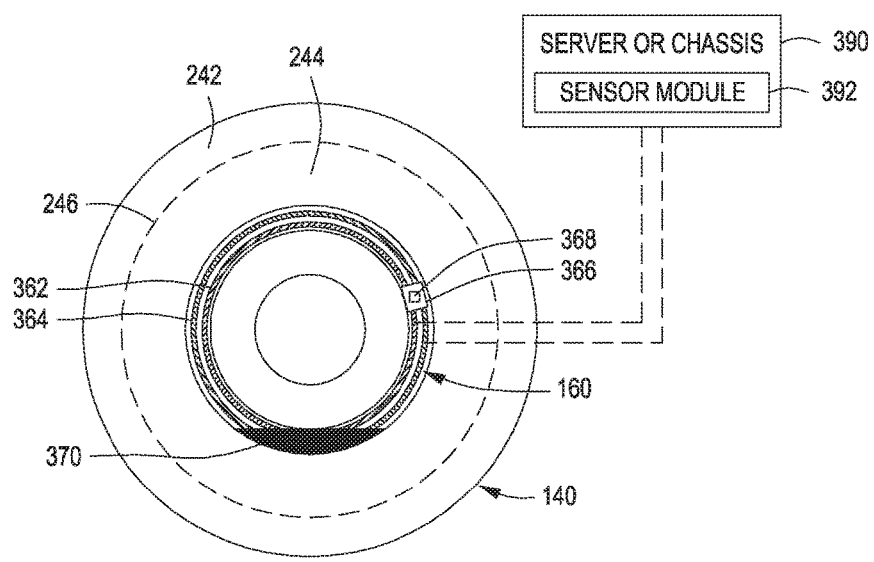
FIG. 3 illustrates a top view of the apparatus of FIG. 1 according to an example.

FIG. 2 illustrates a perspective view of the apparatus of FIG. 1 according to an example. FIG. 3 illustrates a top view of the apparatus of FIG. 1 according to an example. Referring to FIGS. 2-3, the plug 120 is illustrated connected to a first electronic module 230. For example, the electronic module 230 may be a removable server. Alternatively, the electronic module 230 may be a structure or manifold, such as a server rack or a water wall. A water wall is a structure formed to distribute the liquid and it is typically connected to a rack adjacent to the electronic module 230.

The gasket 140 includes a first portion 242 having a first thickness and a second portion 244 having a second thickness with a step member 246 therebetween. The two portions 242, 244 of the gasket 140 may provide guide structures during installation to assist with proper positioning and installation of the plug 120 with a socket. The gasket 140 surrounds the outer perimeter of the plug 120 to provide an added face seal to the mated connection that contains fluid better than a typical blind mate connection. The added seal can help retain any fluid loss including thin fluid film and fluid loss volumes that would be considered a leak. The gasket 140 may be a separate component or connected to the plug 120 and/or the electronic module 230.

As illustrated in FIG. 3, the sensor member 160 includes a set of contacts 362, 364 between the gasket 140 and the plug 120. The set of contacts 362, 364 are connected to a resistor 366 that form a circuit. A predetermined amount of fluid 370 between the pair of contacts 362, 364 will close the circuit and enable a notification to be generated. For example, the sensor member 160 may be located at an axial distance from a mated connection and fluid collection area may be designed to only detect a leak when fluid loss is greater than limits determined by the assembly 100 or system. The contacts 362, 364 for example, may be positioned in a way that they are activated or triggered when fluid rises above a specific fluid level. As illustrated in FIG. 3, the contacts 362, 364, may include a set of wires. The set of wires may run out of the system or may include wireless components, such as a sensor 368 that is part of a near field communication (NFC) system. The sensor member 160 may be a separate component or embedded in the gasket 140. The sensor member may be between the gasket 140 and the plug 120 or outside of the gasket 140.

The notification may be in the form of a visual, audio, and/or combination of such notifications. For example, an ultrahigh-frequency signal may be sent from the sensor member 160 using a battery connected to the pair of contacts 362, 364. Information transmitted from the sensor member 160 with the notification includes providing an exact server location, and possibly identifying the specific plug with the leak. The notification may be sent to a server, chassis, or server rack side 390 of a system and communication may include the management system that controls all sensors in the system, such as a sensor module 392.

Figure 4:
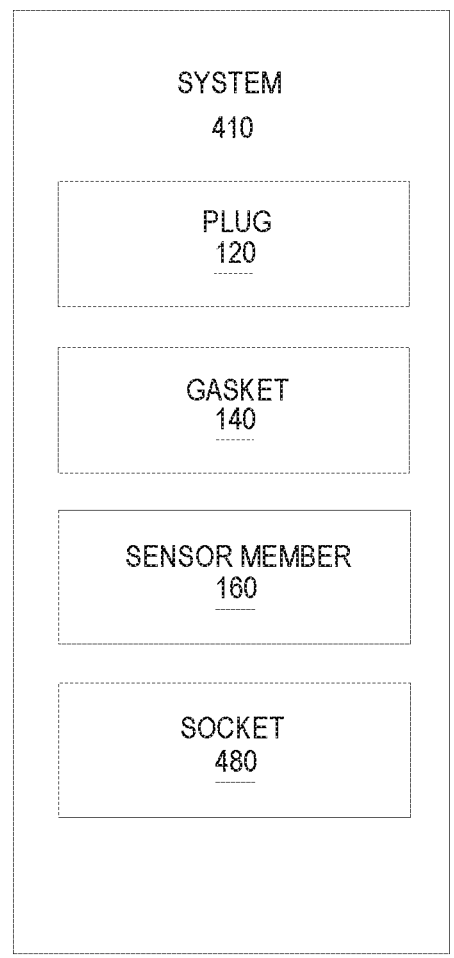
FIG. 4 illustrates a block diagram of a system according to an example.

FIG. 4 illustrates a block diagram of a system 410 according to an example. The system 410 includes a plug 120, a gasket 140, a sensor member 160, and a socket 480. The plug 120 is connected to an electronic module 230, also referred to as a first electronic module 230. The gasket 140 surrounds the plug 120 to provide a fluid-tight seal between the plug 120 and the socket 480. The socket 480 is connected to a second electronic module. The socket 480 receives the plug 120 and engages with the gasket 140 to form a fluid-tight seal. The sensor member 160 is between the plug 120 and the socket 480 to detect fluid loss that exceeds a predetermined amount. For example, the fluid loss may be measured by the volume of fluid that is lost.

Figure 5:
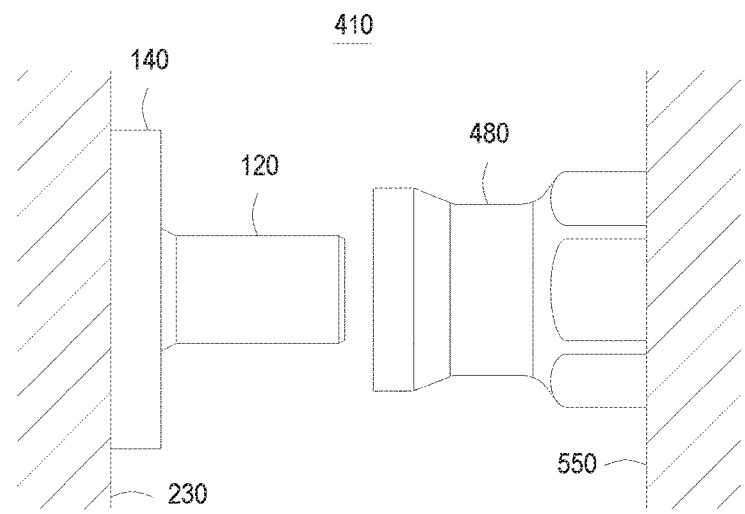
FIG. 5 illustrates a side view of the system of FIG. 4 according to an example.
Figure 6:
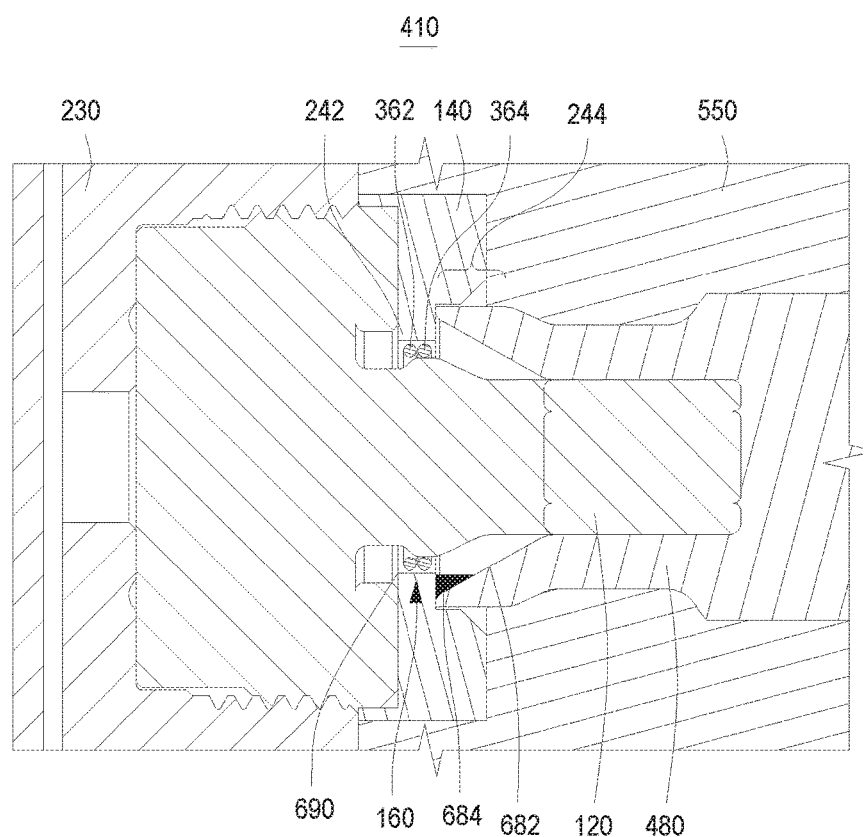
FIGS. 6-8 illustrate cross-sectional views of the system of FIG. 4 according to examples.
Figure 7:
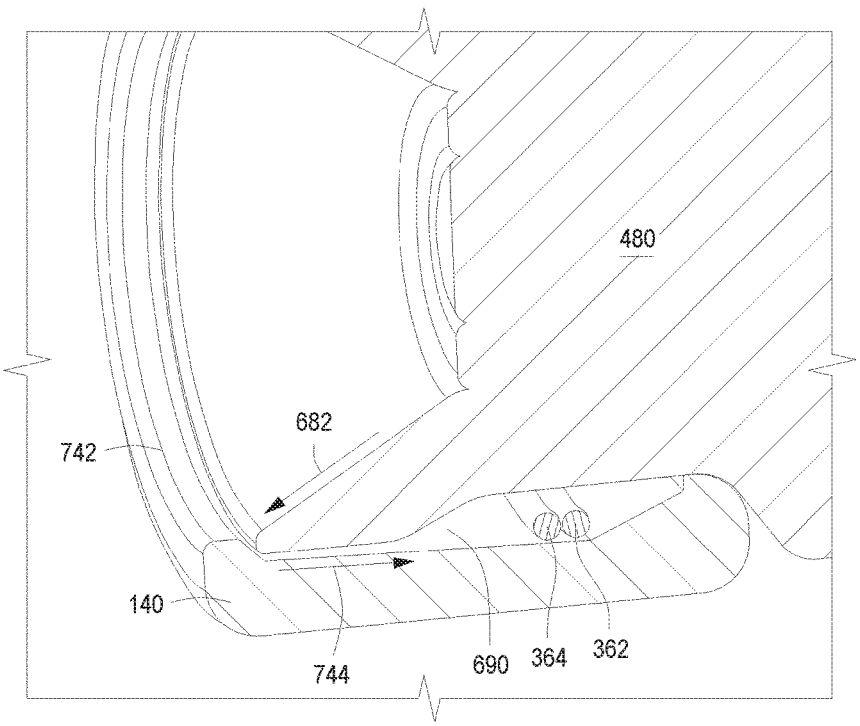
Figure 8:
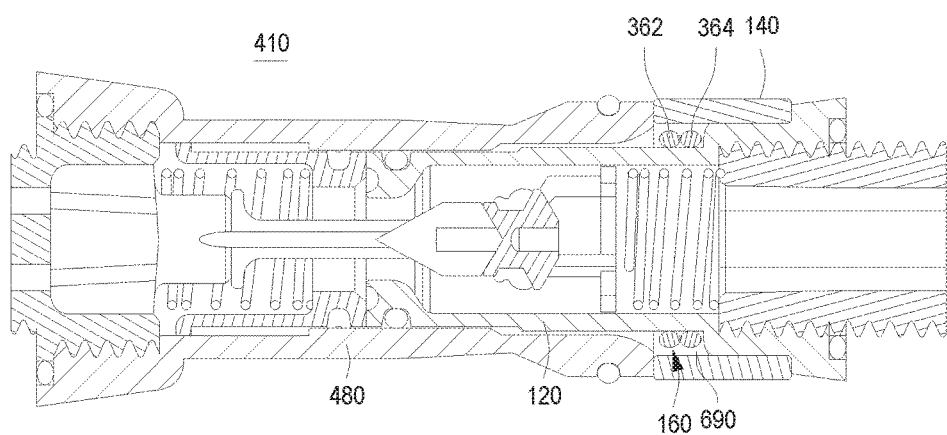

FIG. 5 illustrates the system 410 of FIG. 4 according to an example. The plug 120 is illustrated attached to a first electronic module 230, and the socket 480 is illustrated attached to a second electronic module 550. For example, the first electronic module 230 may be a removable server and the second electronic module 550 may be a server rack, or vice versa. The socket 480 is illustrated to receive the plug 120. The gasket 140 is illustrated as surrounding the plug 120. The gasket 140 may be connected to the plug 120, connected to the first electronic module 230, and/or a separate component that mates with the plug 120 and/or first electronic module 230. The sensor member 160 is not visible from this view, but it is enclosed by the gasket 140. The sensor member 160 may be a separate component, or integrated into the gasket 140, the plug 120, and/or the socket 480. FIGS. 6-8 illustrate examples of the gasket 140.

FIGS. 6-8 illustrate cross-sectional views of the system of FIG. 4 according to examples. Referring to FIG. 6, the plug 120 and socket 480 are mated with the gasket 140 connected between the plug 120 and the socket 480. The gasket 140 is illustrated to include the first portion 242 having a first thickness and the second portion 244 having a second thickness with the step member 246 therebetween. The first portion 242 that mates with the plug 120 and the socket 480. The second portion 244 mates with the sensor member 160 and remains between a portion of the plug 120 and socket 480. The first and second portions 242, 244 surround a portion of the plug 120 and socket 480 when mated or assembled.

The sensor member 160 is also positioned between the plug 120 and the socket 480 with the gasket 140 surrounding the sensor member 160. The sensor member 160 includes the set of contacts 362, 364. The socket 480 includes a slope 682 formed therein that directs or funnels fluid 370 towards a fluid collection area 690 that contains the sensor member 160. The fluid collection area 690 is illustrated between the plug 120 and the socket 480. The fluid collection area 690 is also contained within the gasket 140 to enable a fluid-tight seal. The sensor member 160 may be a loop inside the gasket that can detect fluid loss in excess of a normal fluid volume loss. Even dripless disconnects are not completely lossless. For example, insertion and removal of the connections, i.e., the plug 120 and the socket 480, may generate a thin fluid film from volume loss. The fluid 370 may collect at the bottom 684 of the slope 682, but the volume of fluid 370 may not reach the sensor member 160 in the fluid collection area 690.

In contrast to FIGS. 5-6, that include the gasket 140 is connected to the plug 120, FIG. 7 illustrates an alternative example with the gasket 140 connected to the socket 480. FIG. 7 provides an enlarged cross-sectional view of a portion of the socket 480, gasket 140, and sensor member 160. The gasket 140 includes a lip 742 that directs the fluid from the slope 682 of the socket 480 towards 744 the fluid collection area 690. The sensor member 160 is located within the fluid collection area 690. The set of contacts 362, 364 positioned within the fluid collection area 690 to detect fluid loss that exceeds a predetermined amount. For example, the set of contacts 362, 364 may be a pair of wires connected to a resistor 366 that form a circuit or other electronic components that aid in the detection of fluid presence. The circuit remains open until the predetermined amount of fluid is present. The circuit closes when fluid 370 (illustrated above) between the pair of contacts 362, 364 reaches the predetermined amount of fluid. The circuit may then communicate with a sensor or controller on the server and enables generation of a notification as discussed with reference to FIG. 3.

FIG. 8 illustrates the system the plug 120 and socket 480 used in a blind mate quick disconnect connection. The gasket 140 surrounds the perimeter of the connection. The sensor member 160 is within the gasket 140 and is illustrated to include the pair of contacts 362, 364 as a loop of two wires. The space between the pair of contacts 362, 364 and the gasket 140 is the fluid collection area 690 that allows a small amount of fluid from volume loss to collect. The sensor member 160 triggers the sensor to send a notification or close the circuit, when the fluid exceeds the amount of fluid predetermined to be outside of the normal range.

Figure 9:
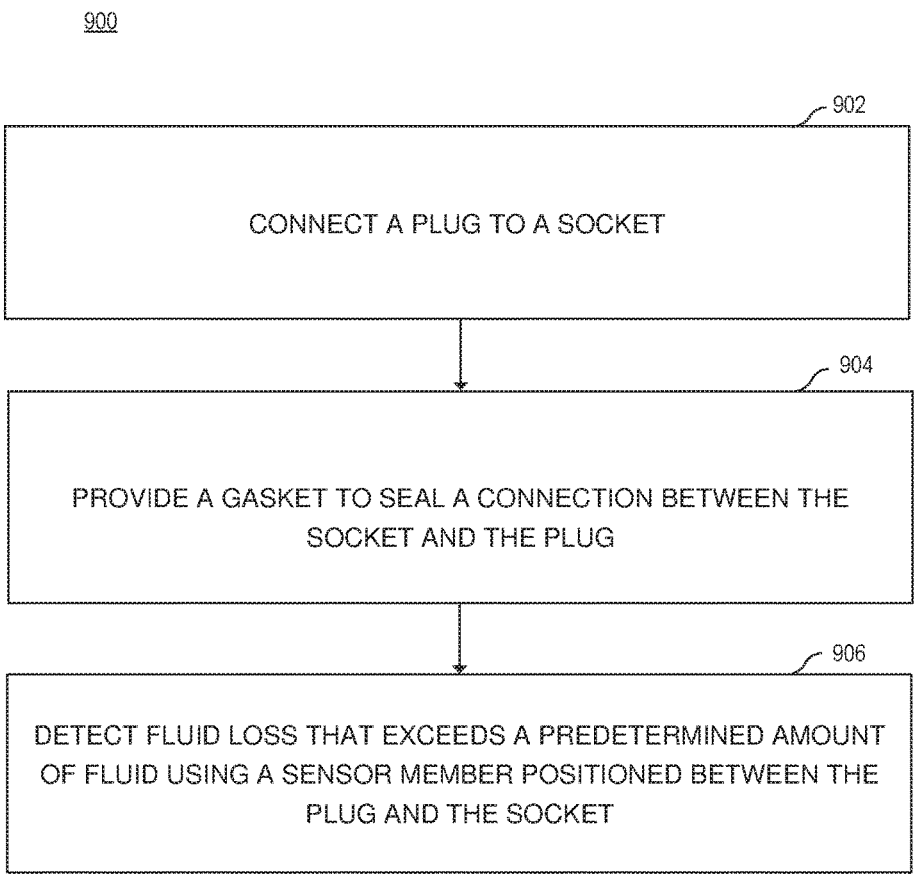
FIG. 9 illustrates a flow chart of a method to detect leaks according to an example.

FIG. 9 illustrates a flow chart 900 of a method to detect leaks according to an example. In block 902, a plug is connected to a socket. A gasket is provided to seal a connection between the socket and the plug in block 904. In block 906, fluid loss that exceeds a predetermined amount of fluid is detected using a sensor member positioned between the plug and the socket. The data related to fluid loss is may be transmitted to an electronic control system via wires on the sensor member and/or wirelessly from the sensor member.

The data transmitted to the electronic control system may trigger the control system and/or an operator to shut off fluid supplies and provide a proper system shut down to enable the equipment to be serviced. This may all be done prior to the breaking the seal of the connection between the socket and the plug, which can save equipment from damage, ensure proper shutdown of equipment, and lower warranty costs.

Although the flow diagram of FIG. 9 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present disclosure.

The present disclosure has been described using non-limiting detailed descriptions of examples thereof and is not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the present disclosure and/or claims, "including but not necessarily limited to."

It is noted that some of the above described examples may include structure, acts or details of structures and acts that may not be essential to the present disclosure and are intended to be examples. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. An assembly comprising:
    a hollow plug connected to a first electronic module and insertable into a socket of a second electronic module to transition fluid between the first and second electronic modules through a fluidic path between the plug and the socket;
    a gasket surrounding the plug and against which the socket is to contact upon insertion of the plug into the socket, the socket and the gasket to form a fluid-tight seal around the plug; and
    a sensor member connected to the gasket to detect more than a predetermined amount of the fluid transitioning between the first and second electronic modules that escapes the fluidic path between the plug and the socket and that remains in a gap exterior to the plug and interior to the socket.

2. The assembly of claim 1, wherein the sensor member comprises a set of wires between the gasket and the plug.

3. The assembly of claim 2, wherein the set of wires are connected to a resistor.

4. The assembly of claim 2, wherein the sensor member comprises a pair of contacts that form a circuit, fluid between the pair of contacts close the circuit and enable a notification to be generated.

5. The assembly of claim 1, wherein the sensor member is embedded in the gasket.

6. The assembly of claim 1, wherein the sensor member comprises a wireless sensor.

7. The assembly of claim 1, wherein the gasket comprises a first portion having a first thickness and a second portion having a second thickness with a step member therebetween.

8. The assembly of claim 1, wherein the gap defines a fluid collection area between the plug and the socket at which the fluid escaping the fluidic path pools when remaining in the gap.

9. The assembly of claim 8, wherein the fluid collection area is defined at a bottom of the gap at which the fluid escaping the fluidic path pools, the sensor member triggering fluid loss when a level of the fluid within the fluid collection area rises to reach the sensor member, the sensor member located at a position above the bottom of the gap corresponding to the predetermined amount of the fluid pooling within the fluid collection area.

10. A system comprising:
    a hollow plug connected to a first electronic module;
    a socket connected to a second electronic module, the plug insertable into the socket to transition fluid between the first and second electronic modules through a fluidic path between the plug and the socket;
    a gasket surrounding the plug and against which the socket is to contact upon insertion of the plug into the socket, the socket and the gasket to form a fluid-tight seal between the plug and a socket;
    a sensor member between the plug and the socket to detect more than a predetermined amount of the fluid transitioning between the first and second electronic modules that escapes the fluidic path between the plug and the socket and that remains in a gap exterior to the plug and interior to the socket.

11. The system of claim 10, wherein the plug is connected to a removable server and the socket is connected to a server rack.

12. The system of claim 10, wherein the gasket comprises a first portion that mates with the plug and the socket and a second portion that mates with the sensor member, the first and second portions to surround a portion of the plug and socket when assembled.

13. The system of claim 10, wherein the gap defines a fluid collection area between the plug and the socket at which the fluid that escapes the fluidic path pools when remaining in the gap.

14. The system of claim 13, wherein the socket comprises a lip to direct fluid that leaks to the fluid collection area.

15. The system of claim 13, wherein the fluid collection area is defined at a bottom of the gap at which the fluid escaping the fluidic path pools, the sensor member triggering fluid loss when a level of the fluid within the fluid collection area rises to reach the sensor member, the sensor member located at a position above the bottom of the gap corresponding to the predetermined amount of the fluid pooling within the fluid collection area.

16. A method to detect leaks, the method comprising:
    connecting a hollow plug to a socket to transition fluid from a first electronic module connected to the plug to a second electronic module connected to the socket through a fluidic path between the plug and the socket;
    providing a gasket surrounding the plug and against which the socket is to contact upon connection of the plug to the socket, the socket and the gasket forming a fluid-tight seal around the plug; and
    detecting more than a predetermined amount of the fluid transitioning between the first and second electronic modules that escapes the fluidic path between the plug and the socket and that remains in a gap exterior to the plug and interior to the socket.

17. The method of claim 16, further comprising transmitting data related to fluid loss to an electronic control system via wires on the sensor member.

18. The method of claim 16, further comprising transmitting data related to fluid loss to an electronic control system wirelessly from the sensor member.

* * * * *